United States Patent [19]
Brockmuller

[11] 3,735,229
[45] May 22, 1973

[54] ELECTRICAL OSCILLATING SERVO MOTOR CONTROL CIRCUIT ARRANGEMENT

[75] Inventor: Ingo Brockmuller, Uerikon, Switzerland

[73] Assignee: EMA AG, Meilen, Switzerland

[22] Filed: Feb. 11, 1972

[21] Appl. No.: 225,496

[30] Foreign Application Priority Data
Feb. 18, 1971 Switzerland..........................2342/71

[52] U.S. Cl......................318/611, 318/621, 331/65, 318/676
[51] Int. Cl...............................................G05b 5/01
[58] Field of Search......................318/611, 621, 676; 331/65

[56] References Cited
UNITED STATES PATENTS

| | | | |
|---|---|---|---|
| 1,959,803 | 4/1934 | Wittkuhns | 318/611 X |
| 2,615,149 | 10/1952 | Toomim | 318/611 X |
| 2,448,564 | 9/1948 | Wilkerson | 318/621 X |
| 2,462,095 | 2/1949 | Halpert et al. | 318/621 X |

*Primary Examiner*—T. E. Lynch
*Attorney*—S. Delvalle Goldsmith, Aaron M. Scharf and Paul B. West et al.

[57] ABSTRACT

An electrical oscillating circuit arrangement with variable degree of damping, comprising an oscillating or tank circuit incorporating an inductive circuit element, and an eddy current body which can be introduced into the magnetic field of said inductive circuit element for changing the degree of damping.

2 Claims, 8 Drawing Figures

Patented May 22, 1973

ELECTRICAL OSCILLATING SERVO MOTOR CONTROL CIRCUIT ARRANGEMENT

BACKGROUND OF THE INVENTION

The present invention relates to a new and improved electric oscillating circuit arrangement having variable damping as well as to the use thereof in an indicating measuring device with a positioning motor or servomotor for adjusting the indicator mechanism and a comparator circuit which compares a control signal based upon the measurement value to be indicated with a comparison signal which can be changed by rotating the servomotor, generates a corresponding differential signal and applies a supply voltage to the servomotor as a function of this differential signal, so that by changing the comparison signal there is produced a null-differential signal.

The prior art is familiar with the technique of altering the degree of damping of an oscillating or tank circuit primarily by changing the electrical parameters of the individual components of the oscillating circuit.

SUMMARY OF THE INVENTION

It is a primary objective of the present invention to provide a new and improved electrical oscillating circuit arrangement, the damping factor of which can be altered in a different manner.

Another and more specific object of the present invention concerns the provision of a new and improved oscillating circuit arrangement wherein for the purpose of changing the degree of damping of the magnetic field of an inductance element energy is removed from the oscillating circuit.

Now in order to implement these and still further objects of the invention, which will become more readily apparent as the description proceeds, the invention contemplates the provision of an eddy current member which, for the purpose of changing the degree of damping can be brought into the magnetic field of the inductive circuit element of the oscillating circuit.

The aforementioned use of the oscillating circuit arrangement in a measuring instrument for indicating a measurement value is manifested by the features that the comparison signal is derived from the voltage tapped-off a switching element of the oscillating circuit and the eddy current member is coupled with the servomotor.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
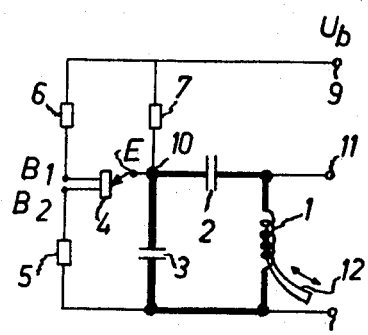
FIG. 1 illustrates circuitry embodying an oscillating circuit arrangement with an oscillator or tank circuit.

Considering now the drawings, in the oscillating circuit arrangement illustrated in FIG. 1 the oscillating or tank circuit thereof is formed by an inductance or coil 1 and the series circuit of both capacitors 2 and 3. The capacitor 3 simultaneously forms a component of the oscillator circuit arrangement which additionally embodies a unijunction transistor 4 and the ohmic resistances or resistors 5, 6 and 7. One base $B_2$ of the transistor 4 is coupled via the resistor 5 with one terminal 8 which is at a potential of null or zero volts. The other base $B_1$ of the transistor 4 is coupled via the resistor 6 with the terminal 9 at which there is also connected the one end of the resistor 7. The other end or terminal of this resistor 7 is coupled with the emitter E of the transistor 4 and the supply junction or terminal 10 of the oscillator or tank circuit.

One end of the inductance 1 is connected with the null potential terminal 8, whereas the other end is electrically coupled with the terminal 11. An eddy current member 12 which can be inserted internally of the inductance or coil 1 for the purpose of changing the degree of damping of the oscillations of the oscillator circuit has only been schematically illustrated in FIG. 1 but will be described more fully hereinafter.

Figure 3:
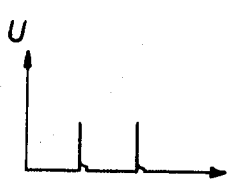
FIG. 3 illustrates the time-course of the voltage appearing at the oscillator circuit arrangement of FIG. 1.
Figure 2:
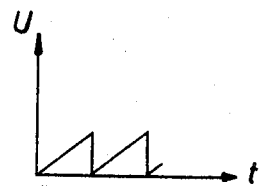
FIG. 2 illustrates the time-course of the voltage appearing at the output of the oscillator circuit arrangement of FIG. 1.

Now if a potential $U_b$ is applied to the terminal 9 then the capacitor 3 charges through the resistor 7. If the voltage at the capacitor 3 has reached a predetermined value, then, the transistor 4 is placed into its conductive state and the capacitor 3 discharges across the transistor 4 and the resistor 5. After a certain discharge time the transistor 4 again blocks and charging of the capacitor 3 again begins. The described procedure repeats and at the supply or infeed junction 10 there is generated a sawtooth voltage which periodically pulses the oscillator circuit, this sawtooth voltage being depicted as a function of time in the graph of FIG. 2. In FIG. 3 there is illustrated the voltage which appears at the base $B_1$ of the transistor 4 as a function of time.

The voltage pulsing the oscillator circuit must not absolutely be a sawtooth voltage. The time-course of such voltage can be extensively optionally selected, still its frequency must be lower than the inherent frequency of the oscillator circuit determined by the inductance and capacitances. Additionally, it is necessary that the pulsing voltage per cycle or period possess at least a steep flank, a condition which can be fulfilled not only by a sawtooth voltage but also for instance by a square-wave voltage.

The pulsed oscillating circuit carries out free oscillations which are damped owing to the ohmic resistance unavoidably present in the oscillator circuit. The oscillations, however, and as explained above, are again periodically excited by the generated sawtooth voltage. Although it is also possible to tap-off the voltage at the capacitor in the exemplary embodiment under consideration, the voltage appearing at the inductance 1 is tapped-off at the terminals 8 and 11.

Figure 4:
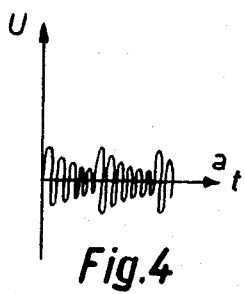
FIGS. 4 and 5 illustrate the time-course of the voltage appearing at the inductance or coil of the oscillator circuit for different degrees of damping.

If the eddy current body 12 is located externally of the magnetic field of the inductance or inductor 1 then a dampened alternating-current voltage, only brought about by the ohmic resistance in the oscillator circuit, appears at the terminals 8 and 11, the time-course of this alternating-current voltage being illustrated in FIG. 4.

Figure 5:
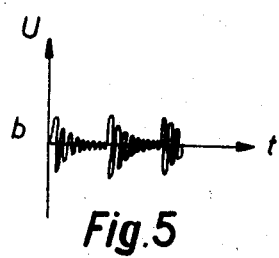

Upon introducing the eddy current body 12 into the inner magnetic field of the inductance 1, present in the exemplary embodiment under consideration, there is produced a damping of the oscillations in addition to the above-described damping present in any case. The time-course of the voltage appearing at the inductance 1 of such additionally dampened oscillations has been represented in FIG. 5.

The voltage at the terminals 8 and 11, and if desired following amplification, can be rectified. The average-value as a function of time of this rectified voltage depends upon the degree of damping which occurs in the oscillator circuit and becomes smaller with increasing degree of damping.

As soon as the eddy current body 12, which must consist of a suitable electrically conductive material, is located at the inner or external magnetic field of the inductance or coil, then eddy currents are induced in the eddy current body producing joulean heat at such eddy current body 12. This heat represents a power loss which must be made-up by the magnetic field of the inductance 1. Therefore, energy is removed from the oscillator circuit, by virtue of which there is exerted a damping effect upon the oscillations of the oscillator circuit.

As is known with increasing cross-section of the eddy current body located in the magnetic field the eddy current losses increase, resulting in an increased removal of energy from the magnetic field of the inductance. Consequently, the degree of damping is also increased.

From what has been discussed above it should be apparent that by increasing the cross-section of the eddy current body it is possible to increase the degree of damping. In analogous manner it is possible to also reduce the degree of damping by having a reduction in the cross-section of the eddy current body. In this regard it is presupposed that the entire eddy current body consist of the same material.

If an eddy current body which is movably arranged with regard to the inductance or coil, and the cross-section of which as viewed in the direction of displacement or movement changes, and if this eddy current body is introduced to a greater or lesser extent into the magnetic field of the inductance, then the obtained degree of damping is dependent upon the cross-section of the section of the eddy current body momentarily located in the magnetic field and therefore upon the position of the eddy current body with respect to the inductance.

Figure 6:
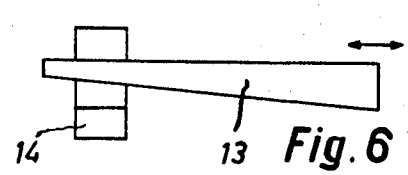
FIG. 6 schematically illustrates an embodiment of eddy current member.

In FIG. 6 there is schematically illustrated a constructional form of eddy current body 13 which can be introduced by translatory motion into the interior of an inductance or coil 14. The eddy current body 13, with constant thickness, exhibits a cross-section which continuously reduces in its direction of displacement.

Figure 6A:
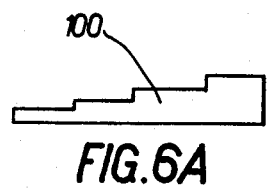
FIG. 6A schematically illustrates a modified form of eddy current member.

The eddy current body can possess any desired form or configuration. Hence, it can be constructed for instance in the form of a sickel or hook which tapers in one direction, as shown for instance in FIG. 1. In such case the eddy current body will not be moved translatory, as was the case for the construction of FIG. 6, but rather by carrying out a rotation and will be thus introduced into the inductance or coil. It is also possible to resort to the use of an eddy current body, the cross-section of which does not continuously change but rather in stages or steps, as same has been indicated in FIG. 6A by reference character 100.

The eddy current body can be formed both of non-magnetic as well as magnetic materials. Still, it is to be observed that when using a ferro-magnetic material, apart from changing the degree of damping by removing energy from the magnetic field, there is also influenced the inductance of the coil, resulting in a change in the inherent frequency of the oscillator or oscillating circuit.

If such change in the inherent frequency of the oscillator circuit is not desired, then, it will be necessary to select a magnetically neutral material for an oscillator circuit with constant inherent frequency.

Apart from the described possibilities it is also conceivable, for the purpose of changing the degree of damping, to connect a temperature-dependent resistor into the oscillator circuit. In such case the voltage which can be tapped-off at an element of the oscillator circuit possesses a value which is a function of the temperature prevailing at such resistor.

With the described oscillator circuit arrangement the voltage which can be tapped-off an element of the oscillator or tank circuit and which corresponds to the spatial position of the eddy current body can be used for indicating the position of such eddy current body. Use of the oscillator circuit arrangement of FIG. 1 in a measurement or measuring instrument will be described in conjunction with the circuit diagram of FIG. 7, to which reference will now be made.

Just as was the case for FIG. 1 the oscillator circuit arrangement embodies an oscillator or tank circuit formed by the inductance or coil 1 and the two capacitors 2 and 3, and which as previously explained, is pulsed by the oscillator circuit arrangement embodying the unijunction transistor 4, the capacitor 3 and the ohmic resistors 5, 6 and 7. The terminals of the oscillator circuit arrangement are designated by reference characters 8, 9 and 11 analogous to the circuit illustration of FIG. 1. The eddy current body 12, arranged to be inserted or immersed into the inductance or coil 1, possesses a substantially sickel-shaped configuration and a cross-section which continuously tapers or narrows. The end of this sickel-shaped eddy current body 12 having the largest cross-section is secured to a pivotal arm member 12a. This pivotal arm member 12a is operatively connected with the schematically illustrated shaft 101 of the speed-reduction transmission or gearing, schematically indicated at 102, of a servo- or positioning motor 15, this shaft simultaneously being operatively coupled with the schematically represented indicating mechanism or indicator 103 of any suitable measuring device or instrument 104.

Figure 7:
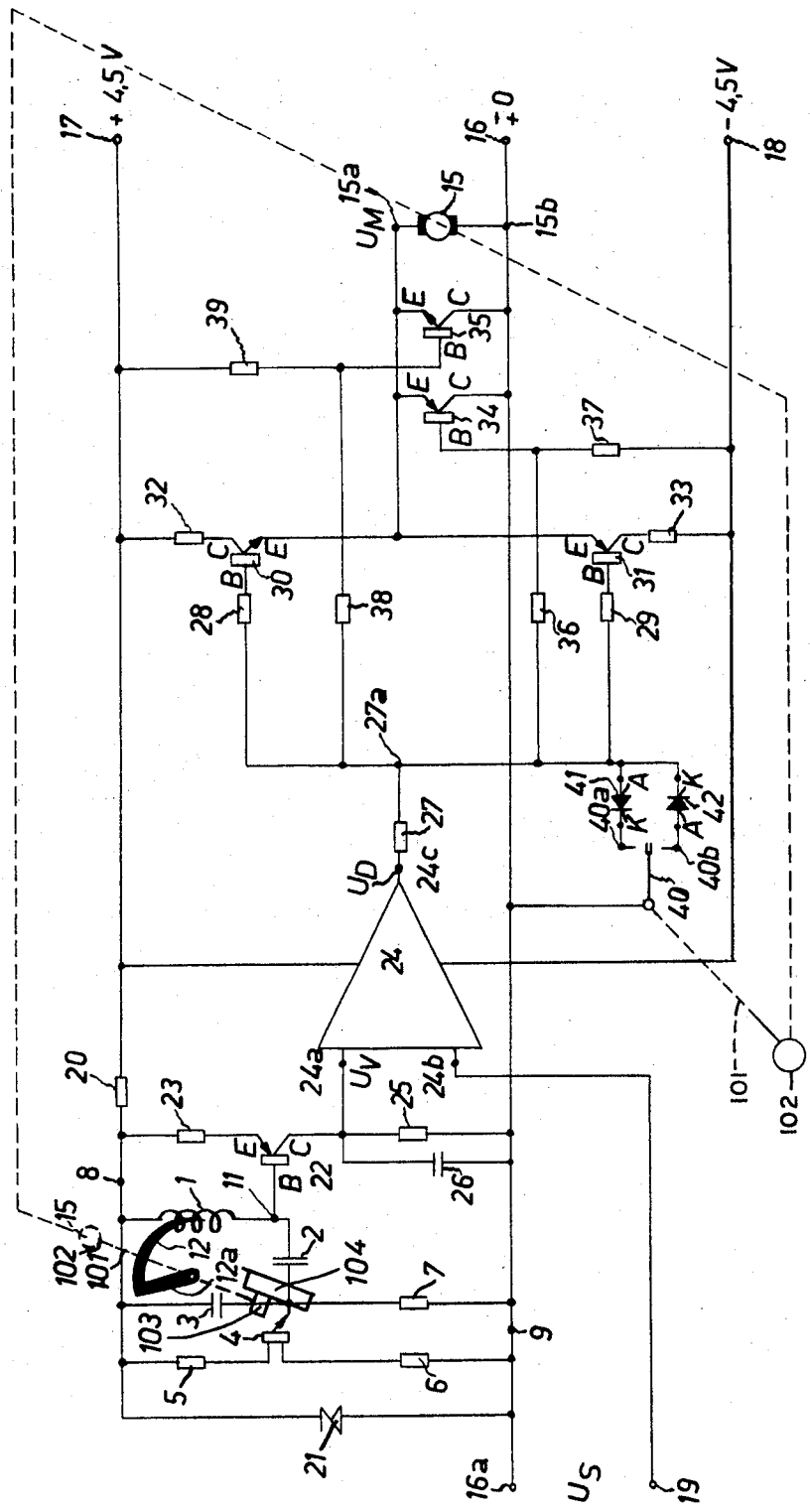
FIG. 7 is a circuit diagram of a measuring or measurement instrument equipped with the electrical oscillating circuit arrangement as depicted in FIG. 1.

The circuit depicted in FIG. 7 serves for controlling the servomotor 15 and is connected via the supply voltage terminals 16, 17 and 18 with a direct-current voltage source. At the input terminals 16a and 19 of the circuit there is applied a DC-control voltage $U_s$ which is dependent upon the magnitude of the measurement value to be indicated. The supply voltage terminal 16 is coupled with the input terminal 16a and is at a potential of null volts, whereas the supply voltage terminals 17 and 18 are at a potential of, for instance, plus 4.5 volts and minus 4.5 volts. The terminal 9 of the oscillator circuit arrangement is coupled with the input terminal 16a, whereas the terminal 8 is connected through the agency of a resistor 20 with the supply voltage terminal 17. A Zener diode 21 is connected between the terminals 8 and 9 of the oscillator circuit arrangement.

The output terminal 11 of the oscillator circuit arrangement is connected with the base B of a transistor 22, the emitter E of which is connected via a resistor 23 with the terminal 8 of the oscillator circuit arrangement. The collector C of this transistor 22 is connected with an input terminal 24a of an amplifier 24 which, in turn, is operatively electrically connected through the agency of a parallel circuit consisting of a resistor 25 and a capacitor 26, with the input terminal 16a. The other input 24b of amplifier 24 is connected with the input terminal 19.

The amplifier 24 is connected with the voltage source through the agency of the supply voltage terminals 17 and 18. The amplifier output 24c is coupled with a resistor 27, at the other connection terminal 27a of which there is connected, via the base protecting resistors 28 and 29, the base B of the transistors 30 and 31 respectively. The collector C of the transistor 30 is electrically connected via a current limiting resistor 32 with the supply voltage terminal 17, whereas the collector C of the transistor 31 is connected via a current limiting resistor 33 with the supply voltage terminal 18. The emitter E of both of these transistors 30 and 31 are connected with one another and with the one terminal 15a of the servomotor 15. The other input terminal 15b of motor 15 is connected with the supply voltage terminal 16.

Two switching transistors 34 and 35 are connected parallel to the servomotor 15, the switching transistors 34 and 35 advantageously possessing high current amplification and small saturation voltage. The emitters E of both switching transistors 34 and 35 are connected with the motor terminal 15a, whereas the collectors C thereof are connected with the motor terminal 15b connected with the supply voltage terminal 16.

The base B of the switching transistor 34 is coupled on the one hand via a resistor 36 with the connection terminal 27a of the resistor 27 and, on the other hand, via a resistor 37 with the supply voltage terminal 18. Both of the resistors 36 and 37 form a voltage divider which fixes the potential of the base B of the switching transistor 34.

The base B of the second switching transistor 35 is connected via a resistor 38 likewise with the connection terminal 27a and via a resistor 39 with the supply voltage terminal 17. Also both of these resistors 38 and 39 form a voltage divider which determines or fixes the potential of the base B of the switching transistor 35.

A contact tongue or blade 40 is secured to the shaft 101 of the speed reduction gearing 102 of the servomotor 15 together with the pivotal arm of the eddy current body 12 and the indicating mechanism 103 of the measuring instrument or device 104, one end of this contact tongue 40 being connected with the supply voltage terminal 16. This contact tongue 40 can be displaced to and fro between two terminal positions, in each terminal position there being present a terminal contact 40a and 40b. The terminal contact 40a is connected with the cathode K of a diode 41, whereas the terminal contact 40b is coupled with the anode A of a diode 42. The anode A of the diode 41 and the cathode K of the diode 42 are connected with the connection terminal or point 27a, as shown.

The voltage appearing at the output terminal 11 of the oscillator circuit arrangement, which as previously described, is influenced by the position of the eddy current body 12 with regard to the inductance or coil 1, is rectified. The rectified voltage derived from the output voltage of the oscillator circuit arrangement is delivered in the form of a comparison voltage $U_V$ to the input terminal 24a of the amplifier. The amplifier 24 compares this comparison voltage $U_V$ with the control voltage $U_S$ applied to the input terminal 24b and produces at its output 24c a corresponding differential voltage $U_D$. The position of the eddy current body 12 with regard to the inductance or coil 1 now should be changed by the servomotor 15 for such length of time until the comparison voltage $U_V$ is equal to the control voltage $U_S$.

The differential voltage $U_D$ at the output 24c for small differences $U_V - U_S$ is approximately proportional to such difference and for large differences $U_V - U_S$, that is, with the amplifier modulated, is approximately equal to the supply voltage, in the present case plus 4.5 volts or minus 4.5 volts. In particular, for the condition $U_V = U_S$ the output voltage $U_D = 1$. Because of the too small output load of the amplifier 24 the servomotor 15 cannot be directly driven by means of such output voltage. The transistors 30 and 31 functioning as complementary impedance converters with their associated resistors 28 and 32 and 29 and 33 respectively apply a voltage $U_M$ to the terminal 15a of the servomotor 15 which is approximately equal to the output voltage $U_D$ of the amplifier, whereby in particular $U_M = O$ for the condition $U_V = U_S$.

If the control voltage $U_S$ is greater than the comparison voltage $U_V$, then, the output voltage $U_D$ of the amplifier 24 is positive, therefore also the respective base B of each of the transistors 30 and 31. Transistor 30 conducts whereas transistor 31 is non-conductive or blocks. Consequently, a positive voltage $U_M$ is applied to the terminal 15a of the servomotor 15. This positive voltage $U_M$, as explained above, is approximately equal in magnitude to the output voltage $U_D$. The motor rotates and rotates the eddy current body 12 out of the inductance 1 in order to generate a higher voltage $U_V$. The switching transistor 35 blocks since its emitter is connected with the positive voltage $U_M$. The resistors 36 and 37 at the base circuit of the switching transistor 34 are dimensioned such that also this switching transistor 34 is non-conductive.

As soon as the eddy current body 12 approximates the position where the value $U_V$ is equal to the value $U_S$ then the amplifier-output voltage $U_D$ is approximately equal to null and both transistors 30 and 31 block. As a result no voltage is applied to the servomotor 15. Since the voltage at the connection terminal or point 27a approaches null the base B of the switching transistor 34 becomes negative. The emitter E of the switching transistor 34 connected with the terminal 15a of the servomotor 15 is coupled with the positive motor terminal voltage $U_M$ which is generated in the form of a counter electromotive force owing to the rotating motor. Consequently, the switching transistor 34 conducts and short-circuits the servomotor 15 which consequently is immediately braked.

As a result damping of the rotational movement of the rotor of the servomotor 15 only becomes effective in the terminal phase of such movement.

If the control voltage $U_S$ is smaller than the comparison voltage $U_V$, then, the described procedure is carried out in analogous fashion, whereby the transistor 31 conducts and the transistor 30 blocks and the servomotor 15 will be short-circuited by the switching transistor 35.

It is possible that the control voltage $U_S$ either assumes such a great or a negative value so that $U_V$ never will be equal to $U_S$. The indicator mechanism coupled with the servomotor 15 will be mechanically blocked in its terminal position, but the motor 15 will have voltage applied thereto. This can result in mechanical or thermal damage to the servomotor 15. So as to prevent such damage the connection junction or point 27a will be connected with the null-potential of the supply voltage terminal 16 by the contact tongue 40 which in its terminal positions always contacts one of both terminal contacts 40a and 40b. Hence the transistor 30 and 31 conducting at this period of time will be blocked and the servomotor 15 will be cut-off from the supply voltage source. As a result the resistor 27 limits the output current of the amplifier 24. Without both of the diodes 41 and 42 the servomotor 15 also now could no longer start-up, if $O<U_S<U_V$, since the connection terminal or junction 27 is continuously at the potential null. If the servomotor 15 with the indicator mechanism, as described, is blocked in the one terminal position then the diode 41 again removes the connection between the connection terminal or point 27a and the terminal 16 as soon as the output voltage $U_D$ at the amplifier 24 becomes negative. The motor can thus start-up in the opposite direction as soon as the control voltage $U_S$ becomes smaller than $U_V$. In the other terminal position the diode 42 assumes the corresponding function.

Instead of an indicator mechanism it is also possible to couple the servomotor 15 with a writing device or recording instrument for recording the measurement value or magnitude.

Through suitable configuration of the eddy current body, which for the above-described use preferably consists of non-magnetic material, it is possible to provide as desired a measurement device having a linear or non-linear indicator scale.

While there is shown and described present preferred embodiments of the invention, it is to be distinctly understood that the invention is not limited thereto but may be otherwise variously embodied and practiced within the scope of the following claims. Accordingly,

What is claimed is:

1. An electrical oscillating circuit arrangement with variable degree of damping, comprising means defining an oscillator circuit incorporating an inductive circuit element, and an eddy current body which can be introduced into the magnetic field of said inductive circuit element of the oscillator circuit for changing the degree of damping and further including a measuring device with an indicator and having a servomotor which can adjust said indicator of such measuring device, a supply voltage means, means defining a comparison circuit which compares a control signal dependent upon the magnitude of the measurement value to be indicated with a comparison signal which can be changed by rotating said servomotor, produces a corresponding differential signal and applies the servomotor to said supply voltage means as a function of such differential signal, in order to generate a null-differential signal by changing the comparison signal, the comparison signal being derived from the voltage which can be tapped-off a component of the oscillator circuit arrangement, and means for operatively coupling the eddy current member with the servomotor.

2. The circuit arrangement as defined in claim 1, wherein said component is constituted by said inductive circuit element.

* * * * *